United States Patent
Kirmse

(10) Patent No.: US 12,039,374 B2
(45) Date of Patent: Jul. 16, 2024

(54) EXTENDABLE CONTAINER-ORCHESTRATION SYSTEM CONTROLLERS

(71) Applicant: SAP SE, Walldorf (DE)

(72) Inventor: Daniel Kirmse, Berlin (DE)

(73) Assignee: SAP SE, Walldorf (DE)

( * ) Notice: Subject to any disclaimer, the term of this patent is extended or adjusted under 35 U.S.C. 154(b) by 376 days.

(21) Appl. No.: 17/324,863

(22) Filed: May 19, 2021

(65) Prior Publication Data

US 2022/0374284 A1 Nov. 24, 2022

(51) Int. Cl.
*G06F 9/50* (2006.01)
*G06F 8/61* (2018.01)
*G06F 9/54* (2006.01)

(52) U.S. Cl.
CPC .............. *G06F 9/5077* (2013.01); *G06F 8/61* (2013.01); *G06F 9/5055* (2013.01); *G06F 9/547* (2013.01); *G06F 2209/505* (2013.01)

(58) Field of Classification Search
CPC . G06F 9/50–547; G06F 2209/505; G06F 8/61
See application file for complete search history.

(56) References Cited

U.S. PATENT DOCUMENTS

| | | | |
|---|---|---|---|
| 2020/0409671 A1* | 12/2020 | Mazurskiy | G06F 8/36 |
| 2021/0303368 A1* | 9/2021 | Yu | G06F 9/00 |
| 2022/0027217 A1* | 1/2022 | Thoemmes | G06F 9/542 |
| 2022/0182439 A1* | 6/2022 | Zhou | H04L 67/51 |
| 2022/0201073 A1* | 6/2022 | Mallikarjuna Durga Lokanath | G06F 9/45558 |
| 2022/0253306 A1* | 8/2022 | Ryan | G06F 8/60 |

(Continued)

FOREIGN PATENT DOCUMENTS

| | | | | |
|---|---|---|---|---|
| CN | 110888736 A | * | 3/2020 | G06F 9/5027 |
| CN | 112395048 A | * | 2/2021 | G06F 8/71 |

OTHER PUBLICATIONS

Metacontroller Documentation Primary Contributors: Anthony "enisoc" and Yeh Grzegorz "grzesuav" Glab Retrieved: web.archive.org/web/20210227235730/https://metacontroller.github.io/metacontroller/print.html Source Repo: github.com/metacontroller/metacontroller (Year: 2021).*

(Continued)

*Primary Examiner* — Emerson C Puente
*Assistant Examiner* — Paul V Mills
(74) *Attorney, Agent, or Firm* — SCHWEGMAN LUNDBERG & WOESSNER, P.A.

(57) ABSTRACT

In an example embodiment, a solution is provided for a container-orchestration service that allows a custom resource to reflect an entire software application while still splitting the actual work out into independent microservices. Specifically, the concepts of an extendable controller and controller extensions are introduced. An extendable controller defines an extendable custom resource. This custom resource is still the main resource describing the entire application, but does so in a way that extensions are referenced that can be defined in their own resources (called extension resources). The extendable controller itself is surrounded by extension controllers, which are responsible for certain aspects of the system that need to be considered in atomic transactions, such as high-availability configuration or scale-out.

20 Claims, 8 Drawing Sheets

(56) References Cited

U.S. PATENT DOCUMENTS

2022/0318001 A1* 10/2022 Freeman ................ G06F 8/30

OTHER PUBLICATIONS

Kubernetes Custom Resources, Controller, and Operator Development Tools Adrian Trouillaud admiralty.io/blog/2018/06/27/kubernetes-custom-resource-controller-and-operator-development-tools/ (Year: 2018).*

Announcing Crossplane v1.0—the Cloud Native Control Plane Phil Prasek /blog.crossplane.io/announcing-crossplane-v1-0/ (Year: 2020).*

KubeSharper: An SDK for Building Kubernetes Operators in C# Valér Orlovský Master's Thesis, Aalborg University, Denmark projekter.aau.dk/projekter/files/334904545/vorlov18_MasterThesis_KubeSharper.pdf (Year: 2020).*

Openshift—"Custom Resource Status" Github project main page and "Object References" Readme Contributors—David Zager, Eric Fried, Nir Magnezi, Michael Henriksen Feb. 21, 2021 commit github.com/openshift/custom-resource-status/tree/420d9ecf2a00ede3326466a446300ab925ae1ddc (Year: 2021).*

"Metacontroller" Github project main page Contributors—Grzegorz Glab, Anthony Yeh, et al. Apr. 27, 2021 commit github.com/metacontroller/metacontroller/tree/98e78a33f654092d2f005ce64c1d80475959a5b3 (Year: 2021).*

Implementation of Backup Resource Management Controller for Reliable Function Allocation in Kubernetes Mengfei Zhu, Rui Kang, Fujun He, and Eiji Oki (Year: 2021).*

\* cited by examiner

EXTENDABLE CONTAINER-ORCHESTRATION SYSTEM CONTROLLERS

TECHNICAL FIELD

This document generally relates to container-orchestration systems. More specifically, this document relates to extendable container-orchestration system controllers.

BACKGROUND

Container-orchestration systems, such as Kubernetes can be used to deploy, scale, and manage computer applications. In a container-orchestration system, an operator is a software component that handles lifecycle event of stateful applications, and in some respects an operator is comparable to an installer.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
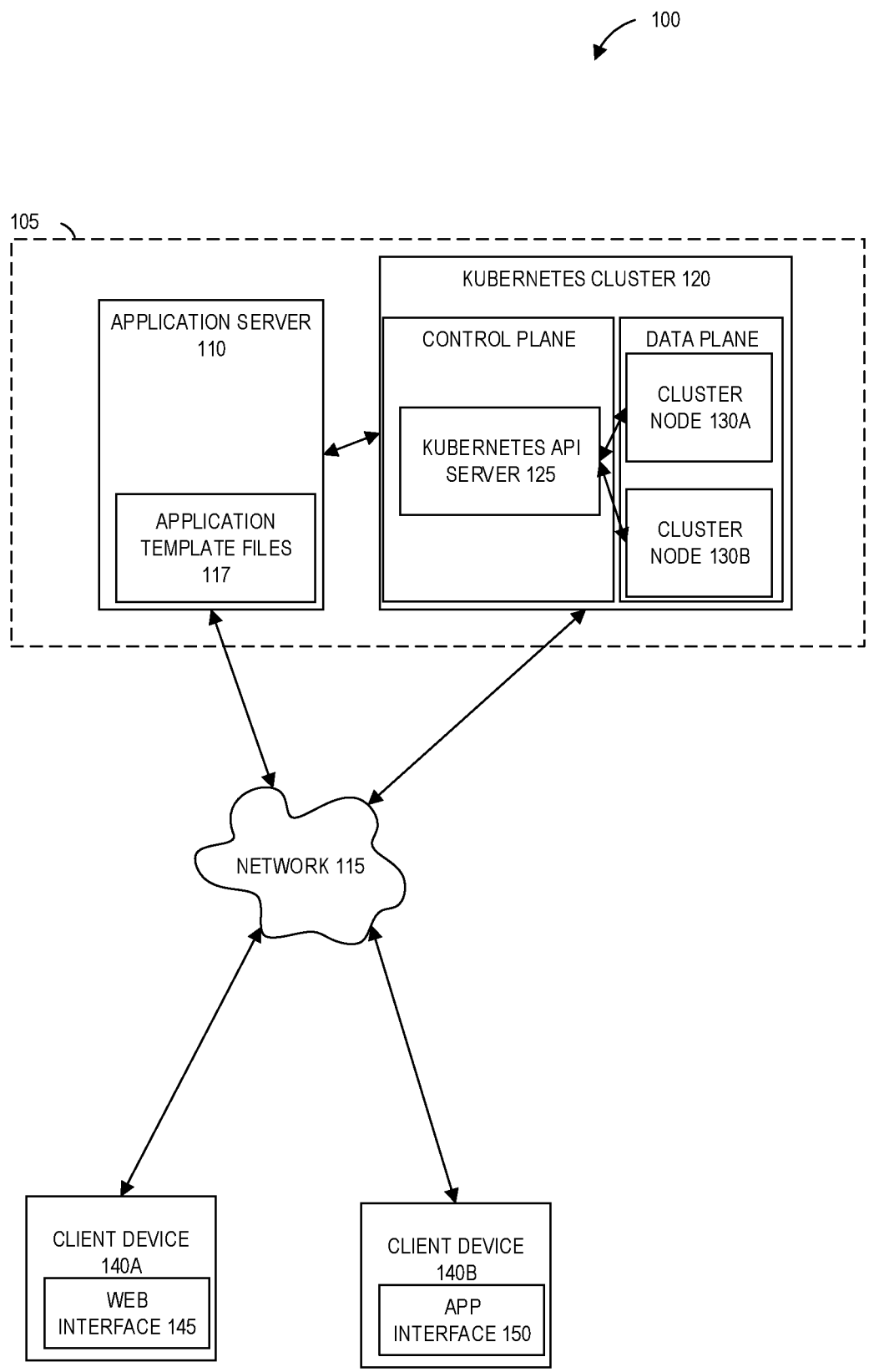
FIG. 1 is a network diagram illustrating a network environment suitable for using Kubernetes as a distributed operating system for a scalable application system, according to some example embodiments.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Configuration parameters for one step installation or upgrade of an application are reflected in container-orchestration systems in what is called a custom resource, which is a file management by the operator component. This file contains various information about the installation, including an application program interface (API) version (which is actually the version of the configuration file) and an application kind (e.g., database, plugin, operator), as well as various other status fields. These API version and kind fields are an important concept of Kubernetes resources. They are key to a certain type of resource that can be managed by a controller. Kubernetes installations include certain resources, such as Pod, Deployment, Service, and Ingress, and also allow for custom resources, introduced by the use of the Kubernetes Operator Framework.

Custom resources are defined by a custom resource definition (CRD) an managed by a controller. Any custom resources created in a Kubernetes cluster has to specify the key to the resource definition it fulfills (API version and kind). If the key is known in the cluster, the resource will be checked against the resource definition. If it compiles, then it gets created and the controller of that resource type will reconcile the resource (e.g., read its content and perform the work to create a state in the cluster that was described by that resource). A controller gets registered in the cluster as being able to reconcile a specific resource type identified by API version and kind.

For large applications, however, the custom resource can become quite large, to the point that it can itself be difficult to manage. More particularly, in large cloud-based applications, it has become common for development of the application to include multiple different teams, each responsible for a different aspect of the application. All of these different aspects, however, must be reflected in the single custom resource. It therefore becomes difficult to coordinate changes to the custom resource among the different teams. There is currently no way to decouple one or more of the aspects from the custom resource, in order to allow a team or team working on those aspects to work independently.

In an example embodiment, a solution is provided for a container-orchestration service that allows a custom resource to reflect an entire software application while still splitting the actual work out into independent microservices. Specifically, the concepts of an extendable controller and controller extensions are introduced. An extendable controller defines an extendable custom resource. This custom resource is still the main resource describing the entire application, but does so in a way that extensions are referenced that can be defined in their own resources (called extension resources). The extendable controller itself is surrounded by extension controllers, which are responsible for certain aspects of the system that need to be considered in atomic transactions, such as high-availability configuration or scale-out.

In order to set up these aspects, additional parameters are added into the custom resource through a common label. More particularly, in an example embodiment, extension points are defined in an extendable custom resource. These extension points are defined by an extendable controller. The extendable custom resource hosts the extension controllers' parameters, which are used to create the extension custom resources.

In an example embodiment, the extension point is a "template" section in the "spec" portion of the custom resource, which serves as the root for all extensions. The Extendable controller makes sure then not to consider the values subordinate to the extension point root. It neither validates them nor interprets them. It merely ensures that any valid structure could be added at the extension point.

Kubernetes is a system for automating deployment, scaling, and management of containerized applications. Application containerization is a virtualization method used by operating systems to deploy and run distributed applications without launching an entire virtual machine for each application.

Containerized applications have advantages over standard applications. When a standard application is installed on a server, libraries required by the application are also installed. Thus, if multiple applications are installed, the libraries on the server are an amalgamation of the libraries required by each of the multiple applications. If one application installs a different version of a library used by another application, the first installed version is overwritten. As a result, an application may use a version of a library that was not tested with the application, which may further result in unexpected behavior.

Kubernetes containers, by virtue of being so modular, are quite conducive to scaling of in-memory database instances. Kubernetes containers are called pods. Each pod is scheduled on a specific host and encapsulates a container for each of one or more applications. If the host becomes unavailable, Kubernetes automatically instantiates the instance on a different host, greatly easing maintenance.

A stateful service is one in which state data is persisted. An in-memory database may be used to persist the state for these stateful services, but they can be managed in Kubernetes clusters using an application program interface (API) extension of a custom resource definition (CRD). A CRD is a set of parameters used by Kubernetes in managing the lifecycle of Kubernetes objects, such as pods. In an example embodiment, stateful applications managed by Kubernetes custom resources are utilized with the behavior toggles. That is, the lifecycle of the stateful application is managed by a custom resource and its controller. This concept is known as a Kubernetes operator.

Lifecycle of the application would include provisioning and decommissioning application instances, as well as any configuration changes of the applications other than actually using the application.

Docker™ is a tool for creating, deploying, and running applications using containers.

FIG. 1 is a network diagram illustrating a network environment 100 suitable for using Kubernetes as a distributed operating system for a scalable application system, according to some example embodiments. The network environment 100 includes a network-based application 105, client devices 140A and 140B, and a network 115. The network-based application 105 is provided by an application server 110 in communication with a Kubernetes cluster 120. The application server 110 accesses application template files 117 to configure and deploy an application to the Kubernetes cluster 120 via the Kubernetes API server 125 interacting with a set of cluster nodes 130A, 130B. The containerized application is provided to the client devices 140A and 140B via a web interface 145 or an application interface 150. The application server 110, the Kubernetes API server 125, the cluster nodes 130A and 130B, and the client devices 140A and 140B may each be implemented in a computer system, in whole or in part, as described below with respect to FIG. 8. The cluster nodes 130A and 130B may be referred to collectively as the cluster nodes 130 or generically as a cluster node 130. The client devices 140A and 140B may be referred to collectively as client devices 140 or generically as a client device 140.

The application server 110 provides a user interface for selecting an application to the client devices 140. The Kubernetes API server 125 provides an interface to the Kubernetes cluster 120 and deploys applications to the cluster nodes 130. The selected application may be invoked via a virtual system application. The client device 140 may provide identifying information to the application server 110, and the identifying information may be used by the Kubernetes API server 125 or the virtual system application to determine a particular instance of the selected application to invoke.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 8. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application server 110, the Kubernetes API server 125, the cluster nodes 130A-130B, and the client devices 140A-140B may be connected by the network 115. The network 115 may be any network that enables communication between or among machines, databases, and devices. Accordingly, the network 115 may be a wired network, a wireless network (e.g., a mobile or cellular network), or any suitable combination thereof. The network 115 may include one or more portions that constitute a private network, a public network (e.g., the Internet), or any suitable combination thereof.

Figure 2:
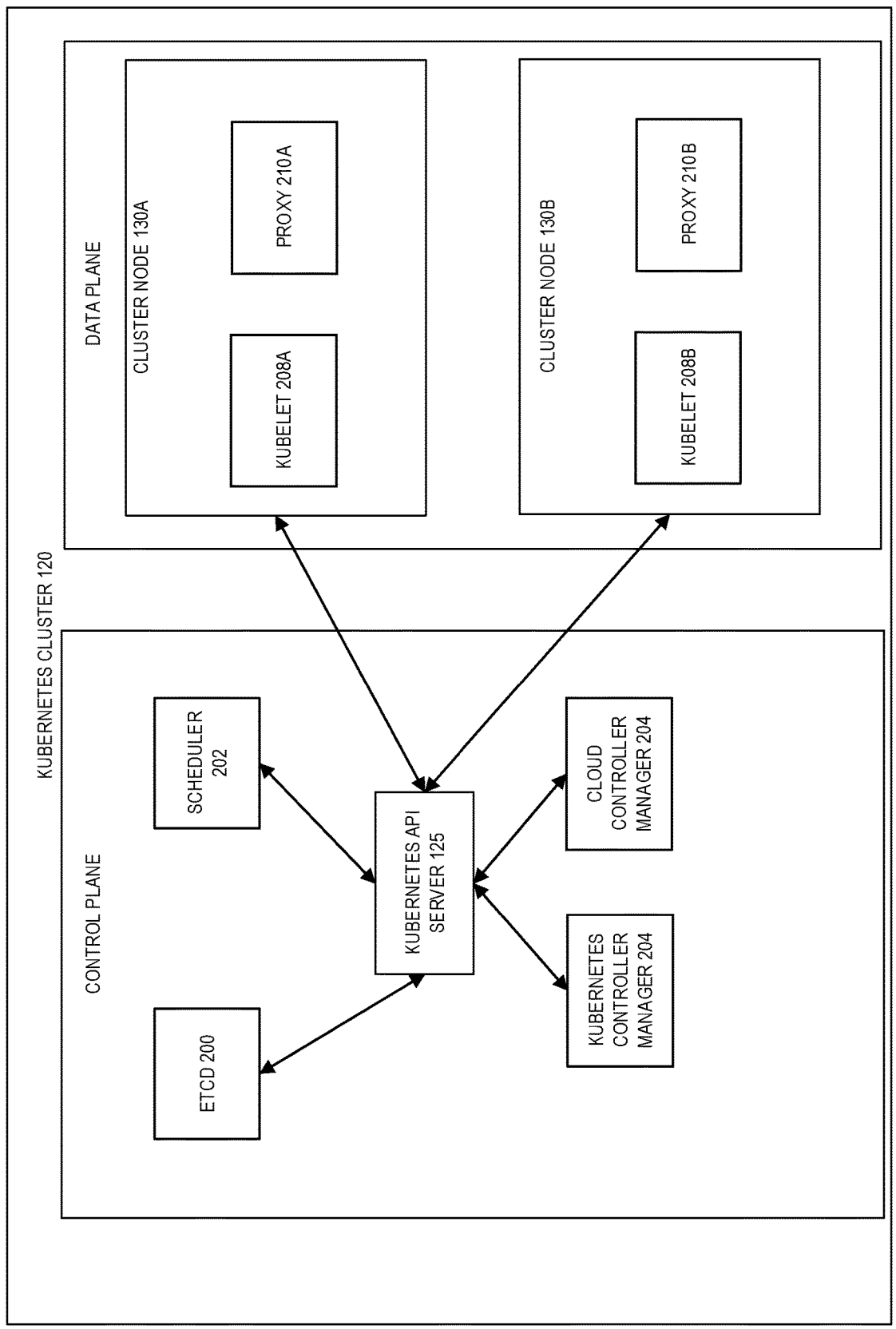
FIG. 2 is a block diagram illustrating components of the Kubernetes cluster 120, according to some example embodiments.

FIG. 2 is a block diagram illustrating components of the Kubernetes cluster 120, according to some example embodiments. The Kubernetes cluster 120 is shown as including the API server 125, as well as an ETCD 200, scheduler 202, Kubernetes controller manager 204, and cloud controller manager 204, all contained in a control plane. ETCS 200 is a consistent and highly-available key value store used as a backing store for all cluster data. Scheduler 202 watches for newly created Pods with no assigned node and selects a node for them to run on (based on, for example, individual and collective resource requirements, hardware/software/policy constraints, affinity and anti-affinity specifications, data locality, inter-workload interference, and deadlines. Controller manager 204 runs controller processes. Logically, each controller is a separate process, but to reduce complexity they all may be compiled into a single binary and run in a single process. Cloud controller manager 206 embeds cloud-specific control logic. It lets a user link a cluster to a cloud provider API, and separates out the components that interact with the cloud platform from components that interact only with the cluster.

A data plane then contains cluster nodes 130A, 130B. Each cluster node 130A, 130B contains a Kubelet 208A, 208B and a proxy 210A, 210B. Kubelet 208A, 208B is an agent that makes sure that containers are running in a Pod. It takes a set of Pod specifications that are provided through various mechanisms and ensures that the containers described in those specifications are running and healthy. The proxy 210A, 210B maintains network rules on a cluster node 130A, 103B. These rules allow network communication to Pods from network sessions inside or outside of the Kubernetes cluster 120.

The user interface module 320 causes presentation of a user interface for the cluster node 130A on a display associated with the client device 140A or 140B. The user interface allows a user to interact with the application instance.

Figure 3:
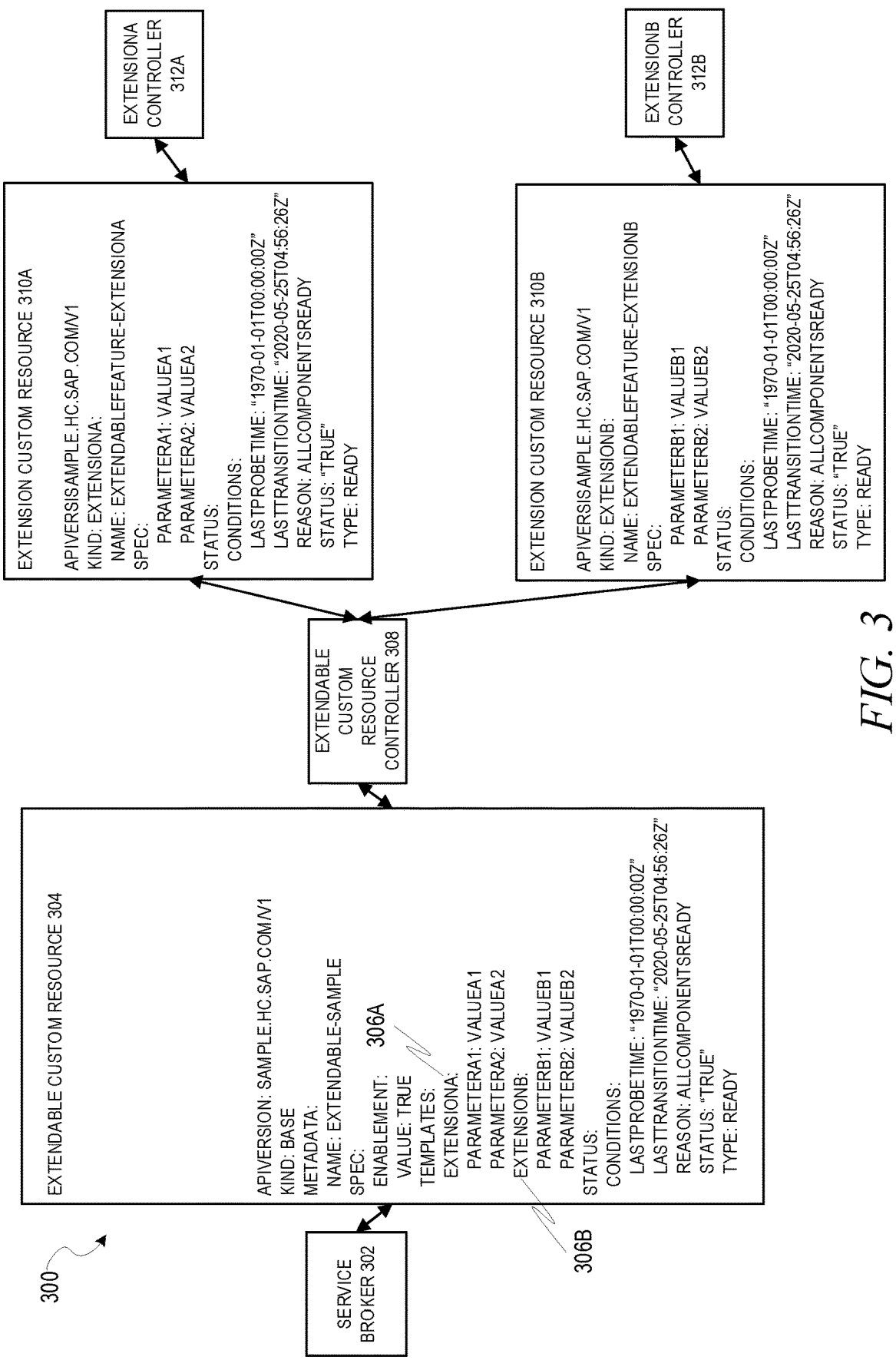
FIG. 3 is a block diagram illustrating a system for extending a custom resource, in accordance with an example embodiment.

FIG. 3 is a block diagram illustrating a system 300 for extending a custom resource, in accordance with an example embodiment. A service broker 302 interacts with an extendable custom resource 304. The extendable custom resource 304 contains one or more extension points (here, there is one, named "TEMPLATES," containing two extensions: extension A 306A and extension B 306B). An extendable custom resource controller 308 operates similar to a typical custom resource controller in a container-orchestration system, in that it interprets elements within the extendable custom resource 304, with the exception of the extension point named "TEMPLATES," containing extensions 306A, 306B, which it does not interpret. Rather, the extendable custom resource controller 308 include a library (or one or more APIs) that implements an algorithm to create update, or delete extension custom resources 310A, 310B out of data found in the extensions 306A, 306B. The library may be provided by a controller extension controller (not pictured here, but discussed further with respect to FIG. 4 below).

Each extension custom resource 310A, 310B then has its own extension controller 312A, 312B, respectively.

Figure 4:
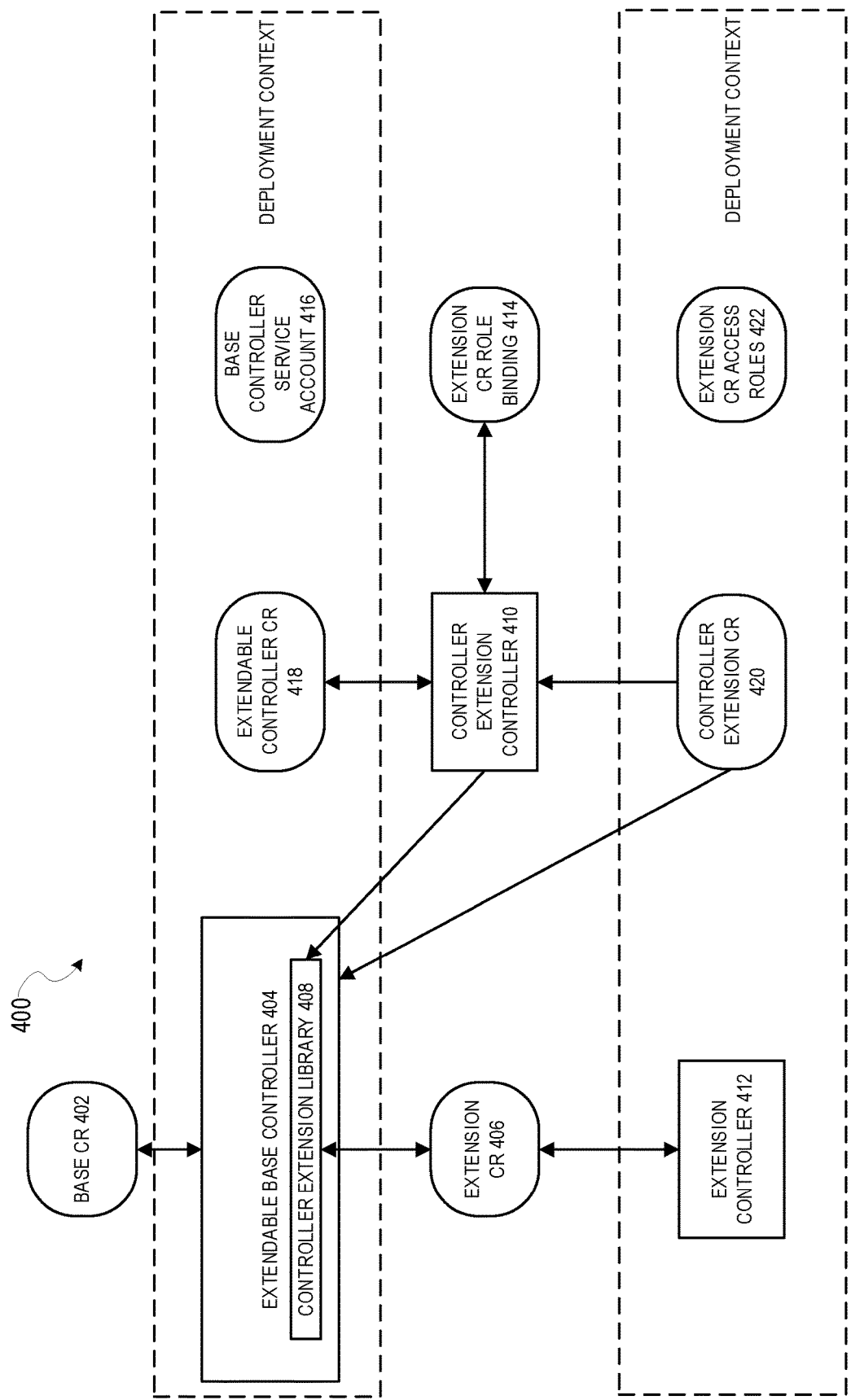
FIG. 4 is a block diagram illustrating a controller extensions architecture, in accordance with an example embodiment.

FIG. 4 is a block diagram illustrating a controller extensions architecture 400, in accordance with an example embodiment. A base custom resource 402 may include one or more extension points, as described above. An extendable base controller 404 may then generate one or more extension custom resources 406 from the information in the extension points using a controller extension library 408 provided by a controller extension controller 410. Each extension custom resource 406 then has a corresponding extension controller 412. An extension controller 412 operates similar to a typical custom resource controller in a container-orchestration system, in that it interprets elements within the extension custom resource 406.

Additionally, the controller extension controller 410 manages role bindings, such as extension custom resource role binding 414, which controls the roles required to modify the extension custom resources 406 and the service account 416 of the extendable base controller 404.

Extension custom resources 406 are based on extension custom resource definitions, which are provided by the extension controllers 412. As such, the extendable base controller 404 has no privileges to read or modify the extension custom resources 406. It also cannot grant these rights to itself, as it does not even know about them before such extension custom resources come into existence. This provides decoupling between the extendable base controller 404 and the extension controllers 412.

The extendable base controller 404 is deployed together with the extendable controller custom resource 418 and a base controller service account definition 416. The extendable controller custom resource 418 is meant to describe the custom resource definition that could be extended and the path that serves as the extension point. This information is relevant so that the extension controller 412 knows where to put its parameters. It also defines the service account 416 that the roles to modify extension resources are bound to by the controller extension controller 410. Below is an example of an extendable controller custom resource, in accordance with an example embodiment:

```
apiVersion: controllerextension.hc.sap.com/v1alpha1
kind: ExtendableController
metadata:
 name: basecontroller-v1alpha1
spec:
 extends:
  apiVersion: sample.hc.sap.com/v1alpha1
  kind: Base
  extensionPoint: .spec.templates.{extensionName}
  serviceAccount: basecontroller
```

A controller extension custom resource 420 declares an extension for an extendable controller. It specifies five things: (1) which executable controller it is extending by providing the name of the extendable controller custom resource 418 (based-controller-v1alpha1 in the example below); (2) which custom resource has to be generated by the extendable controller (ExtensionA in version "sample.hc.sap.com/v1alpha1" in the example below); (3) which roles 422 need to be bound to the extendable controller service account (-extension-editor-role in the example below); (4) which path of the base custom resource it is referring to (spec.templates.extensionA in the example below); and (5) which template has to be applied to generate the extension custom resource from the base custom resource (everything after "template" in the example below). Below is an example of a controller extension custom resource definition in accordance with an example embodiment:

```
ApiVersion: controllerextension.hc.sap.com/v1alpha1
kind: ControllerExtension
metadata:
 name: extensionA
spec:
 extends: basecontroller-v1alpha1
 creates:
  apiVersion: sample.hc.sap.com/v1alpha1
  kind: ExtensionA
 roles:
```

```
    - extension-editor-role
  handles:
   path: spec.templates.extensionA
   template: |-
    {{ with $doc :=. }}
    ---
    apiVersion: sample.hc.sap.com/v1alpha1
    kind: ExtensionA
    metadata:
     name: {{ $doc.metadata.name }}-extensionA
     namespace: {{ $doc.metadata.namespace }}
    spec:
     parameterA1: {{ $doc.spec.templates.extensionA.parameterA1 }}
     parameterA2: {{ $doc.spec.templates.extensionA.parameterA2 }}
    {{end}}
    {{end}}
```

Figure 5:
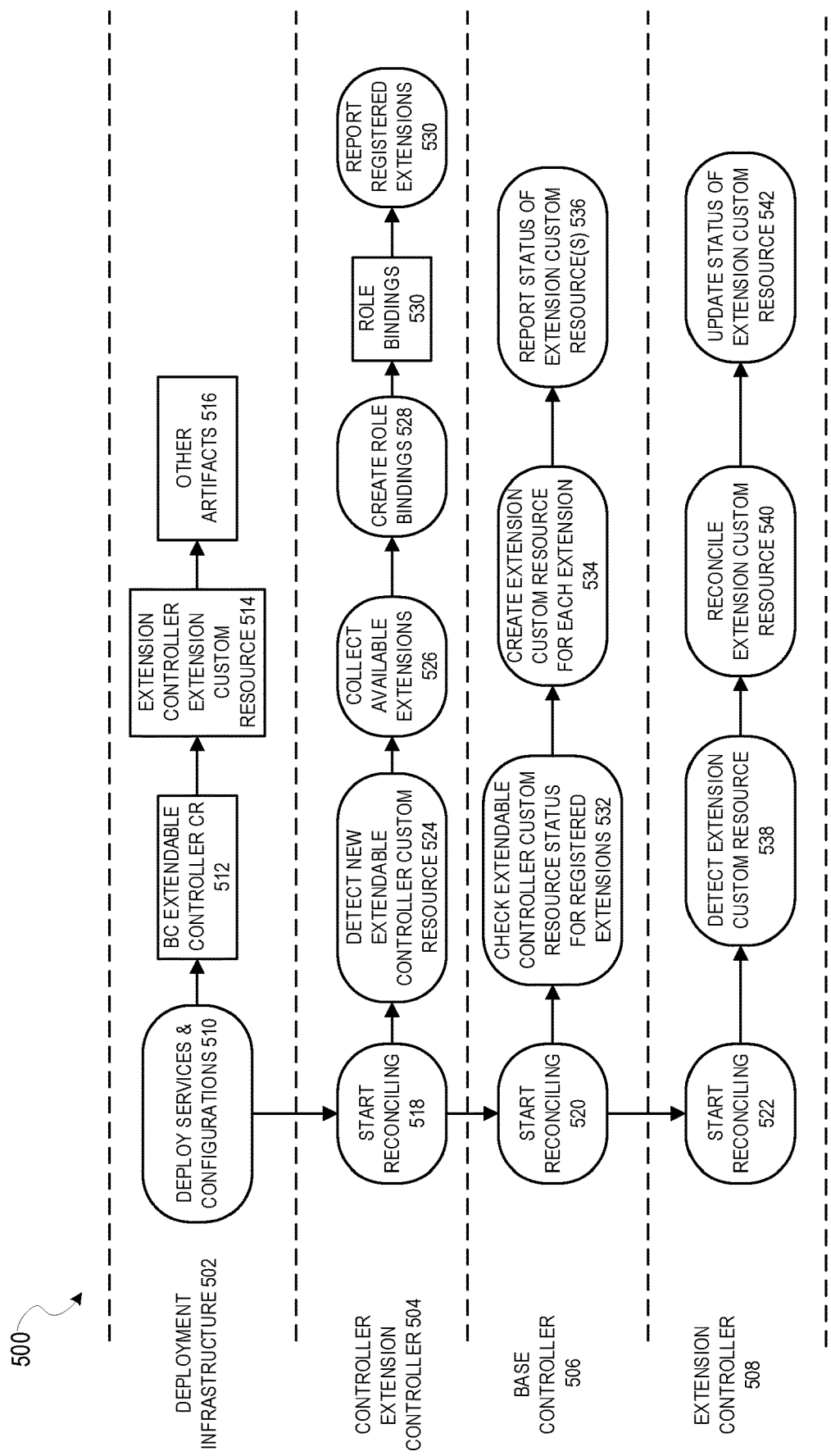
FIG. 5 is a sequence diagram illustrating a method for reconciliation of controller extensions, in accordance with an example embodiment.

FIG. 5 is a sequence diagram illustrating a method 500 for reconciliation of controller extensions, in accordance with an example embodiment. The method 500 may utilize a deployment infrastructure 502, controller extension controller 504, base controller 506, and extension controller 508.

At operation 510, the deployment infrastructure 502 deploys services and configurations from the extendable custom resource. This includes deploying a base controller extendable controller custom resource 512, an extension controller extension custom resource 514, and other artifacts 516. Each of the controller extension controller 504, base controller 506, and extension controller 508 can then start reconciling at operations 518, 520, and 522, respectively.

Starting at operation 518, the controller extension controller 504 acts to set up a controller extension. When a new extendable controller custom resource appears in the Kubernetes cluster, the controller extension controller 504 detects it at operation 524 and collects any existing controller extensions available for it at operation 526. At operation 528, the controller extension controller 504 creates role bindings for the base controller service account to the editor roles of the extension custom resource, producing a cluster of role bindings 530. At operation 532, the controller extension controller 504 reports registered extensions in the status of the base controller extendable controller custom resource. This reports the available extensions to the base controller. An example base controller extendable controller custom resource is as follows:

```
apiVersion: controllerextension.hc.sap.com/v1alpha1
kind: ExtendableController
metadata:
 name: basecontroller-v1alpha1
spec:
 extends:
  apiVersion: sample.hc.sap.com/v1alpha1
  kind: Base
 extensionPoint: .spec.templates.{extensionName}
 serviceAccount: basecontroller
status:
 extensions:
 extensionA
```

By reporting extensionA in the extensions section of the status section. this informs the base controller that extension A is an available extension. This is considered by the base controller when reconciling its base custom resource.

The base controller 506 then performs operations to generate extension custom resources. At operation 532, the base controller 506 checks the extendable controller custom resource status for registered extensions. If there are no extensions then there is nothing more for the base controller to do. If there are one or more extensions, then at operation 534, an extension custom resource is created for each extension. Then at operation 536 the status of the extension custom resource(s) is reported back to the base custom resource.

Thus, for example, assume a base controller and a registered extension controller for it, such as in the following custom resource:

```
apiVersion: sample.hc.sap.com/v1
kind: Base
metadata:
 name: extendable-sample
spec:
 enablement:
  value: true
 templates:
  extensionA:
   parameterA1: valueA1
   parameterA2: valueA2
```

Then assume that the registered extension "extensionA" is defined by the controller extension custom resource as follows:

```
apiVersion: controllerextension.hc.sap.com/v1alpha1
kind: ControllerExtension
metadata:
 name: extensionA
spec:
 extends: basecontroller-v1alpha1
 creates:
  apiVersion: sample.hc.sap.com/v1alpha1
  kind: ExtensionA
 roles:
  - extension-editor-role
 handles:
  path: spec.templates.extensionA
  template: |-
   {{ with $doc :=. }}
   ---
   apiVersion: sample.hc.sap.com/v1alpha1
   kind: ExtensionA
   metadata:
    name: {{ $doc.metadata.name }}-extensionA
    namespace: {{ $doc.metadata.namespace }}
   spec:
    parameterA1: {{ $doc.spec.templates.extensionA.parameterA1 }}
    parameterA2: {{ $doc.spec.templates.extensionA.parameterA2 }}
   {{end}}
   {{end}}
```

When the base controller reconciles the custom resource "Extendable-sample," it will hand over the content of the extension point ".spec.templates" to the reconcile function provided by the controller extension library. The library will then use the registered extension custom resource "extensionA" to handle the content of the path ".spec.templates.extensionA". It will then use the template to convert it into a valid custom resource of a kind ExtensionA. Then it will create that custom resource by calling the Kubernetes API server. The result will look like the following:

```
apiVersion: sample.hc.sap.com/v1
kind: ExtensionA
metadata:
 name: extendable-sample-extensionA
 labels:
  extends: extendable-sample.base.hc.sap.com
spec:
 parameterA1: valueA1
 parameterA2: valueA2
```

The label "Extends" is used to identify all custom resources of a kind ExtensionA that were generated from a given custom resource of kind base. This is used when deleting generated extension custom resources.

Each time the base custom resource is modified, the base controller will reconcile that change. It then hands over the content of the extension point to the controller extension library, which will generate the extension custom resource and update it at the Kubernetes API server. Deletion can be handled by the controller library as well. It checks the registered extensions for resources no longer present in the extension point. It will then use the label "Extends" to identify those resources that belong to the resource reconciled.

The extension controller then performs operations to reconcile extension custom resources. At operation 538, the extension controller detects an extension custom resource. In an example embodiment, this may involve receiving a notification from the API server that the extension custom resource has been created/updated/deleted and which extension custom resource this pertains to. Once created, extension custom resources are handled like normal custom resources by the respective extension controller with respect to all lifecycle aspects of custom resources. There is no interaction of the extension controller with the base custom resource, the extendable controller, or the controller extension controller. When a controller extension gets deleted, the controller extension controller will remove it from the extendable controller custom resource status. Thus, the extended controller will no longer consider this extension when reconciling base custom resources. Extension custom resources already existing will not be deleted.

Then at operation 540, the extension controller reconciles the extension custom resource. This may include working on the requested change to the extension custom resource. Then at operation 542, the extension controller updates the status of the extension custom resource. This may include reporting the result of working on applying the necessary changes requested by the change in the extension custom resource.

Figure 6:
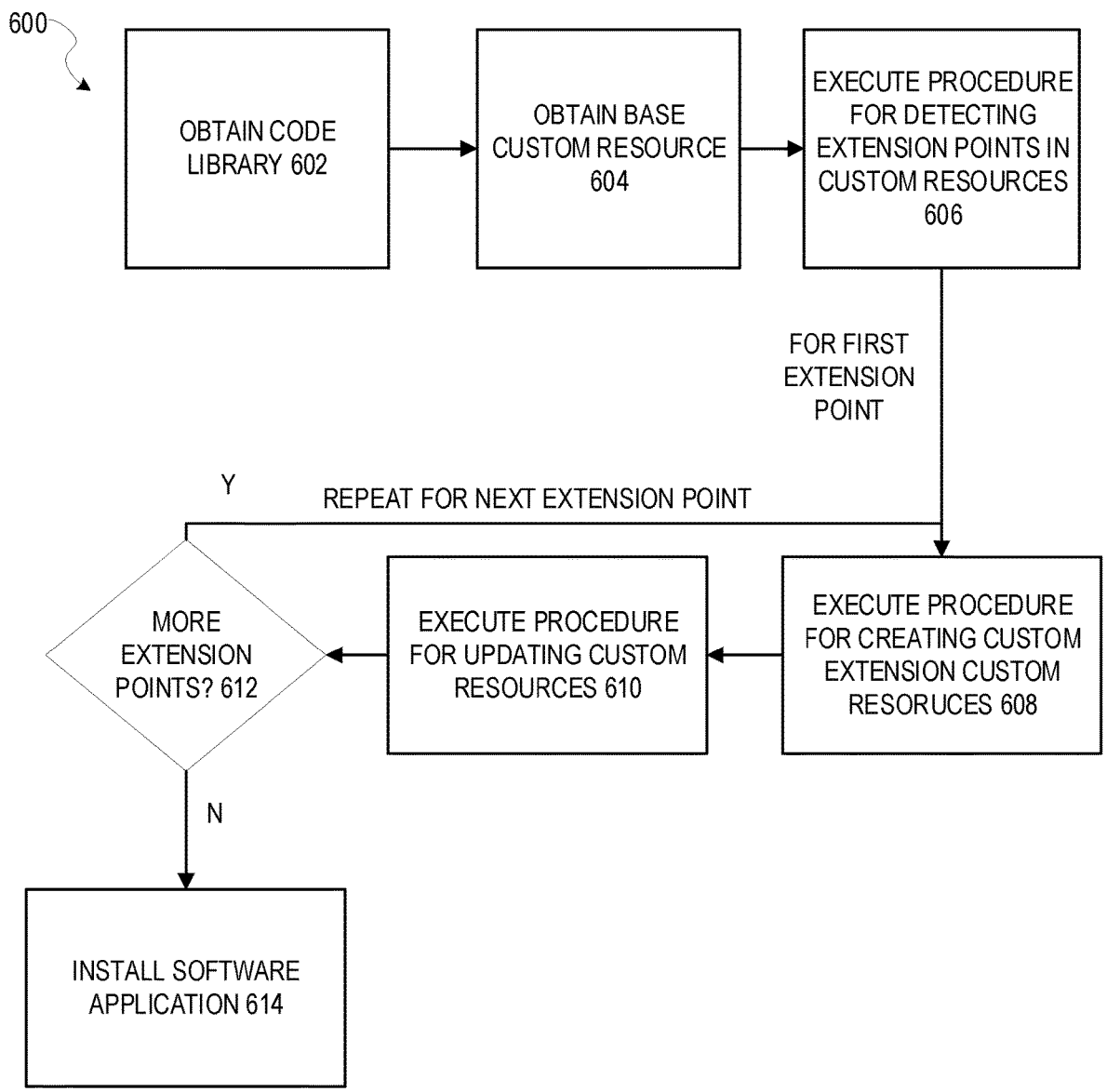
FIG. 6 is a flow diagram illustrating a method of reconciling a custom resource in a container-orchestration system, in accordance with an example embodiment.

FIG. 6 is a flow diagram illustrating a method 600 of reconciling a custom resource in a container-orchestration system, in accordance with an example embodiment. At operation 602, a code library is obtained, the code library including a procedure for detecting extension points in custom resources, a procedure for creating extension custom resources, and a procedure for updating custom resources. At operation 604, a base custom resource of the container-orchestration system is obtained.

At operation 606, the procedure for detecting extension points in custom resources is executed to detect one or more extension points in the base custom resource. Then a loop is performed for each of the one or more extension points in the base custom resource. At operation 608, the procedure for creating extension custom resources is executed to create a corresponding extension custom resource. This may include calling a Kubernetes Application Program Interface (API) server.

At operation 610, the procedure for updating custom resources is executed to update the base custom resource with a status for the corresponding extension custom resource. This may include listing an extension for the corresponding extension custom resource in a status section of an extendable controller custom resource, and reconciling the base custom resource, the reconciling including considering the extendable controller custom resource.

At operation 612, it is determined if there are any more extension points in the base custom resource. If so, then the method 600 loops back to operation 608 for the next extension point.

If not, then at operation 614, the software application corresponding to the base custom resource is installed by instantiating a container using the base custom resource and all extension custom resources having extension points in the base custom resource. It should be noted that the application instance may comprise multiple containers being instantiated, one for each "core" part defined by the base controller 404. Others are a result of an extension CR.

In view of the disclosure above, various examples are set forth below. It should be noted that one or more features of an example, taken in isolation or combination, should be considered within the disclosure of this application.

Example 1. A system comprising:
at least one hardware processor; and
a computer-readable medium storing instructions that, when executed by the at least one hardware processor, cause the at least one hardware processor to perform operations comprising:
obtaining a code library, the code library including a procedure for detecting extension points in custom resources, a procedure for creating extension custom resources, and a procedure for updating custom resources;
obtaining a base custom resource of a container-orchestration system;
executing the procedure for detecting extension points in custom resourced to detect one or more extension points in the base custom resource; and
for each of the one or more extension points in the base custom resource:
executing the procedure for creating extension custom resources to create a corresponding extension custom resource; and
executing the procedure for updating custom resources to update the base custom resource with a status for the corresponding extension custom resource.

Example 2. The system of Example 1, wherein the base custom resource corresponds to a software application and the operations further comprise:
causing an installation of the software application by instantiating a container using the base custom resource and all extension custom resources having extension points in the base custom resource.

Example 3. The system of Examples 1 or 2, wherein the executing the procedure for updating custom resources includes:
listing an extension for the corresponding extension custom resource in a status section of an extendable controller custom resource; and
reconciling the base custom resource, the reconciling including considering the extendable controller custom resource.

Example 4. The system of any of Examples 1-3, wherein each extension point is identified by an identification in a section of the base custom resource, the section having a name defined by an extendable controller custom resource.

Example 5. The system of Example 4, wherein the container-orchestration system is Kubernetes.

Example 6. The system of any of Examples 1-5, wherein the executing the procedure for creating extension custom resources includes calling a Kubernetes Application Program Interface (API) server.

Example 7. The system of any of Examples 1-6, wherein the code library is provided by a controller extension controller.

Example 8. A method comprising:
obtaining a code library, the code library including a procedure for detecting extension points in custom resources, a procedure for creating extension custom resources, and a procedure for updating custom resources;
obtaining a base custom resource of a container-orchestration system;
executing the procedure for detecting extension points in custom resourced to detect one or more extension points in the base custom resource; and
for each of the one or more extension points in the base custom resource:
executing the procedure for creating extension custom resources to create a corresponding extension custom resource; and
executing the procedure for updating custom resources to update the base custom resource with a status for the corresponding extension custom resource.

Example 9. The method of Example 8, wherein the base custom resource corresponds to a software application and the method further comprises:
causing an installation of the software application by instantiating a container using the base custom resource and all extension custom resources having extension points in the base custom resource.

Example 10. The method of Example 8 or 9, wherein the executing the procedure for updating custom resources includes:
listing an extension for the corresponding extension custom resource in a status section of an extendable controller custom resource; and
reconciling the base custom resource, the reconciling including considering the extendable controller custom resource.

Example 11. The method of any of Examples 8-10, wherein each extension point is identified by an identification in a section of the base custom resource, the section having a name defined by an extendable controller custom resource.

Example 12. The method of Example 11, wherein the container-orchestration system is Kubernetes.

Example 13. The method of any of Examples 8-12, wherein the executing the procedure for creating extension custom resources includes calling a Kubernetes Application Program Interface (API) server.

Example 14. The method of any of Examples 8-13, wherein the code library is provided by a controller extension controller.

Example 15. A non-transitory machine-readable medium storing instructions which, when executed by one or more processors, cause the one or more processors to perform operations comprising:
obtaining a code library, the code library including a procedure for detecting extension points in custom resources, a procedure for creating extension custom resources, and a procedure for updating custom resources;
obtaining a base custom resource of a container-orchestration system;
executing the procedure for detecting extension points in custom resourced to detect one or more extension points in the base custom resource; and
for each of the one or more extension points in the base custom resource:
executing the procedure for creating extension custom resources to create a corresponding extension custom resource; and
executing the procedure for updating custom resources to update the base custom resource with a status for the corresponding extension custom resource.

Example 16. The non-transitory machine-readable medium of Example 15, wherein the base custom resource corresponds to a software application and the operations further comprise:
causing an installation of the software application by instantiating a container using the base custom resource and all extension custom resources having extension points in the base custom resource.

Example 17. The non-transitory machine-readable medium of Example 15 or 16, wherein the executing the procedure for updating custom resources includes:
listing an extension for the corresponding extension custom resource in a status section of an extendable controller custom resource; and
reconciling the base custom resource, the reconciling including considering the extendable controller custom resource.

Example 18. The non-transitory machine-readable medium of any of Examples 15-17, wherein each extension point is identified by an identification in a section of the base custom resource, the section having a name defined by an extendable controller custom resource. Example 19. The non-transitory machine-readable medium of Example 18, wherein the container-orchestration system is Kubernetes.

Example 20. The non-transitory machine-readable medium of any of Examples 15-19, wherein the executing the procedure for creating extension custom resources includes calling a Kubernetes Application Program Interface (API) server.

Figure 7:
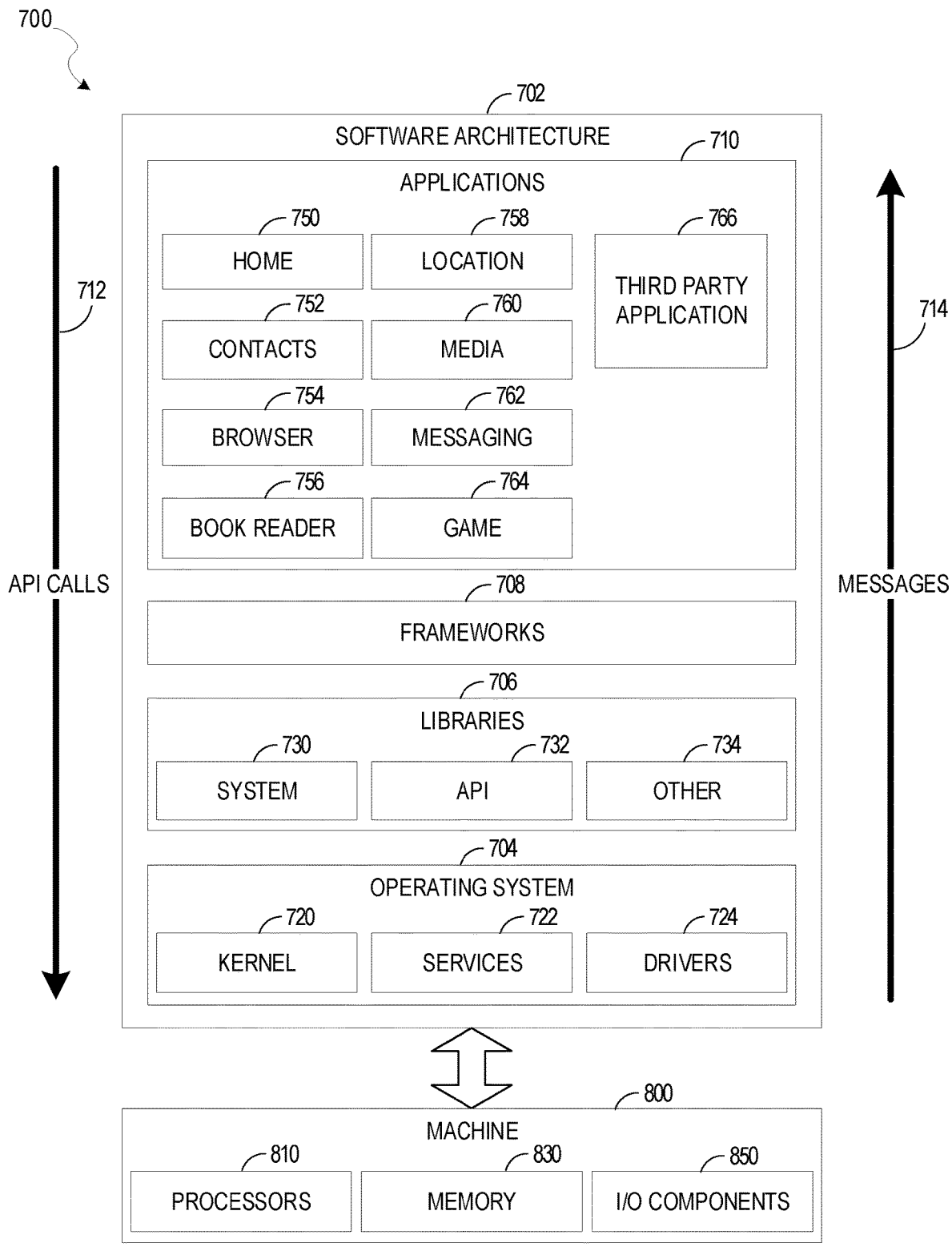
FIG. 7 is a block diagram illustrating an architecture of software, which can be installed on any one or more of the devices described above.

FIG. 7 is a block diagram 700 illustrating a software architecture 702, which can be installed on any one or more of the devices described above. FIG. 7 is merely a non-limiting example of a software architecture, and it will be appreciated that many other architectures can be implemented to facilitate the functionality described herein. In various embodiments, the software architecture 702 is implemented by hardware such as a machine 800 of FIG. 8 that includes processors 810, memory 830, and input/output (I/O) components 850. In this example architecture, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke Application Program Interface (API) calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphical user interface (GUI) functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications, such as a third-party application 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 766 can invoke the API calls 712 provided by the operating system 704 to facilitate functionality described herein.

Figure 8:
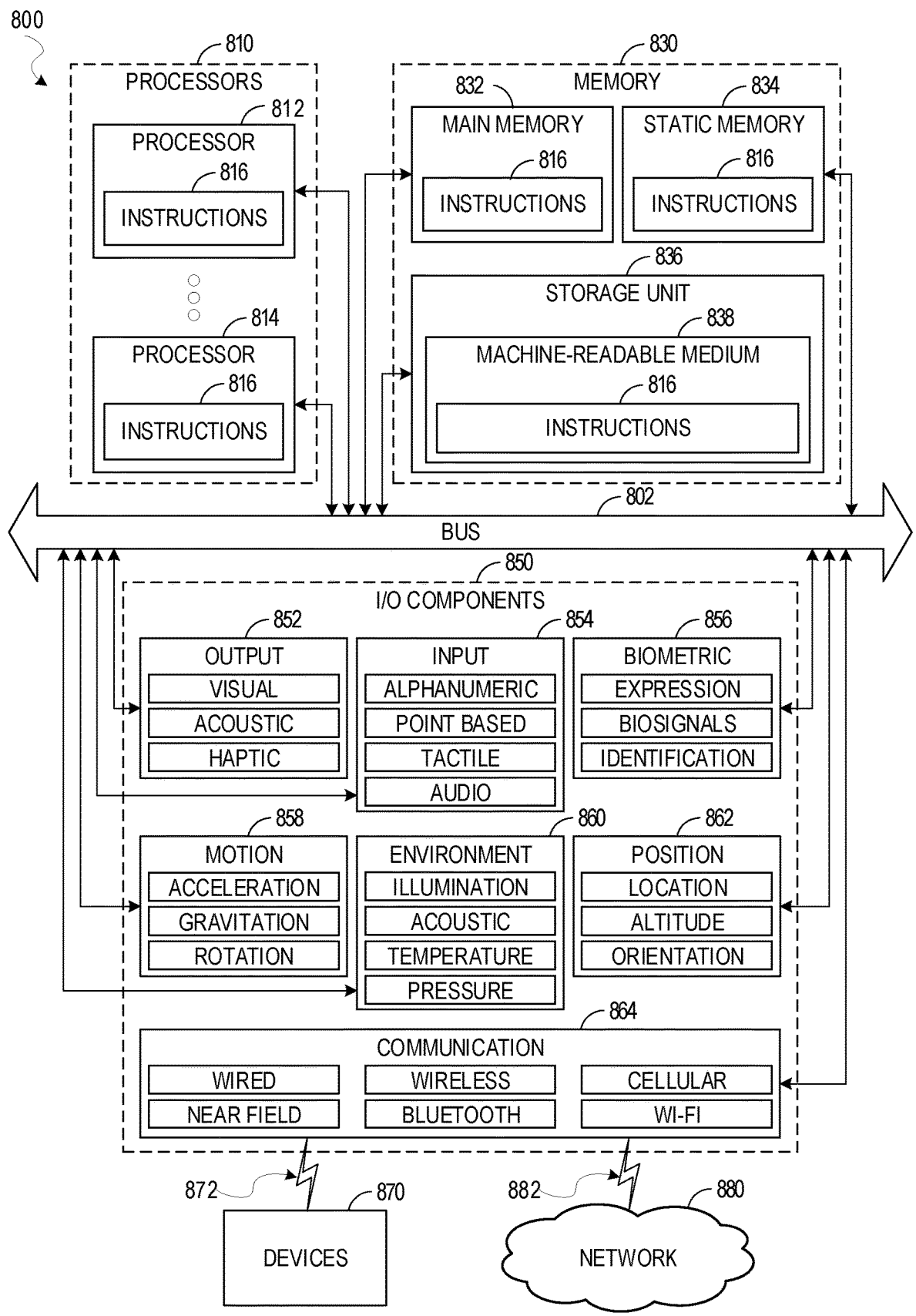
FIG. 8 illustrates a diagrammatic representation of a machine in the form of a computer system within which a set of instructions may be executed for causing the machine to perform any one or more of the methodologies discussed herein, according to an example embodiment.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute the methods of FIGS. 5 and 6. Additionally, or alternatively, the instructions 816 may implement FIGS. 1-6 and so forth. The instructions 816 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors that may comprise two or more independent processors (sometimes referred to as "cores") that may execute instructions 816 contemporaneously. Although FIG. 8 shows multiple processors 810, the machine 800 may include a single processor 812 with a single core, a single processor 812 with multiple cores (e.g., a multi-core processor 812), multiple processors 812, 814 with a single core, multiple processors 812, 814 with multiple cores, or any combination thereof.

The memory 830 may include a main memory 832, a static memory 834, and a storage unit 836, each accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion, and the grouping is in no way limiting. In various example embodiments, the I/O components 850 may include output components 852 and input components 854. The output components 852 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., coupled via a USB).

Moreover, the communication components 864 may detect identifiers or include components operable to detect identifiers. For example, the communication components 864 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

The various memories (i.e., 830, 832, 834, and/or memory of the processor(s) 810) and/or the storage unit 836 may store one or more sets of instructions 816 and data structures (e.g., software) embodying or utilized by any one or more of the methodologies or functions described herein. These instructions (e.g., the instructions 816), when executed by the processor(s) 810, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., Hypertext Transfer Protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
   obtaining a code library, the code library including a procedure for detecting extension points in custom resources, a procedure for creating extension custom resources, and a procedure for updating custom resources;
   obtaining a base custom resource of a container-orchestration system;
   executing the procedure for detecting extension points in the custom resources to detect one or more extension points in the base custom resource without interpreting the one or more extension points; and
   for each of the one or more extension points detected in the base custom resource:
   executing the procedure for creating extension custom resources to create a corresponding extension custom resource; and
   executing the procedure for updating custom resources to update the base custom resource with a status for the corresponding extension custom resource by adding an identifier for the corresponding extension custom resource in a status section of an extendable controller custom resource.

2. The system of claim 1, wherein the base custom resource corresponds to a software application and the operations further comprise:
   causing an installation of the software application by instantiating a container using the base custom resource and all extension custom resources having extension points in the base custom resource.

3. The system of claim 1, wherein the executing the procedure for updating custom resources comprises:
   reconciling the base custom resource, the reconciling including examining the extendable controller custom resource.

4. The system of claim 1, wherein each extension point is identified by an identification in a section of the base custom resource, the section having a name defined by an extendable controller custom resource.

5. The system of claim 4, wherein the container-orchestration system is Kubernetes.

6. The system of claim 1, wherein the executing the procedure for creating extension custom resources includes calling a Kubernetes Application Program Interface (API) server.

7. The system of claim 1, wherein the code library is provided by a controller extension controller.

8. A method comprising:
   obtaining a code library, the code library including a procedure for detecting extension points in custom resources, a procedure for creating extension custom resources, and a procedure for updating custom resources;
   obtaining a base custom resource of a container-orchestration system;
   executing the procedure for detecting extension points in custom resourced to detect one or more extension points in the base custom resource without interpreting the one or more extension points; and
   for each of the one or more extension points in the base custom resource:
   executing the procedure for creating extension custom resources to create a corresponding extension custom resource; and
   executing the procedure for updating custom resources to update the base custom resource with a status for the corresponding extension custom resource by adding an identifier for the corresponding extension custom resource in a status section of an extendable controller custom resource.

9. The method of claim 8, wherein the base custom resource corresponds to a software application and the method further comprises:

causing an installation of the software application by instantiating a container using the base custom resource and all extension custom resources having extension points in the base custom resource.

10. The method of claim 8, wherein the executing the procedure for updating custom resources includes:
reconciling the base custom resource, the reconciling including examining the extendable controller custom resource.

11. The method of claim 8, wherein each extension point is identified by an identification in a section of the base custom resource, the section having a name defined by an extendable controller custom resource.

12. The method of claim 11, wherein the container-orchestration system is Kubernetes.

13. The method of claim 8, wherein the executing the procedure for creating extension custom resources includes calling a Kubernetes Application Program Interface (API) server.

14. The method of claim 8, wherein the code library is provided by a controller extension controller.

15. A non-transitory machine-readable medium storing instructions which, when executed by one or more processors, cause the one or more processors to perform operations comprising:
obtaining a code library, the code library including a procedure for detecting extension points in custom resources, a procedure for creating extension custom resources, and a procedure for updating custom resources;
obtaining a base custom resource of a container-orchestration system;
executing the procedure for detecting extension points in custom resourced to detect one or more extension points in the base custom resource without interpreting the one or more extension points; and
for each of the one or more extension points in the base custom resource:
executing the procedure for creating extension custom resources to create a corresponding extension custom resource; and
executing the procedure for updating custom resources to update the base custom resource with a status for the corresponding extension custom resource by adding an identifier for the corresponding extension custom resource in a status section of an extendable controller custom resource.

16. The non-transitory machine-readable medium of claim 15, wherein the base custom resource corresponds to a software application and the operations further comprise:
causing an installation of the software application by instantiating a container using the base custom resource and all extension custom resources having extension points in the base custom resource.

17. The non-transitory machine-readable medium of claim 15, wherein the executing the procedure for updating custom resources includes:
reconciling the base custom resource, the reconciling including examining the extendable controller custom resource.

18. The non-transitory machine-readable medium of claim 15, wherein each extension point is identified by an identification in a section of the base custom resource, the section having a name defined by an extendable controller custom resource.

19. The non-transitory machine-readable medium of claim 18, wherein the container-orchestration system is Kubernetes.

20. The non-transitory machine-readable medium of claim 15, wherein the executing the procedure for creating extension custom resources includes calling a Kubernetes Application Program Interface (API) server.

* * * * *